United States Patent [19]

Roetker et al.

[11] Patent Number: 5,234,013
[45] Date of Patent: Aug. 10, 1993

[54] TANK VENTING CONTROL ASSEMBLY

[75] Inventors: John J. Roetker, Indianapolis; Lowell R. Bell, Connersville, both of Ind.

[73] Assignee: Stant Manufacturing Inc., Connersville, Ind.

[21] Appl. No.: 909,962

[22] Filed: Jul. 7, 1992

[51] Int. Cl.⁵ .............................................. F16K 24/00
[52] U.S. Cl. ...................... 137/43; 137/202; 137/489.5; 137/493; 137/510; 137/522; 137/587
[58] Field of Search ............... 137/202, 412, 510, 587, 137/39, 43, 489.5, 522, 493; 251/39

[56] References Cited

U.S. PATENT DOCUMENTS

| | | | |
|---|---|---|---|
| 1,200,842 | 10/1916 | Johnson | 137/522 X |
| 2,133,200 | 10/1938 | Kenneweg | 277/45 |
| 2,399,326 | 4/1946 | Crot | 98/1.5 |
| 2,860,656 | 11/1958 | Eshbaugh | 137/202 |
| 3,495,619 | 2/1970 | Iizumi | 251/39 X |
| 3,606,908 | 9/1971 | Riester | 137/116 |
| 3,651,829 | 3/1972 | Frantz | 137/522 X |
| 4,088,162 | 5/1978 | Rossi | 137/522 X |
| 4,706,708 | 11/1987 | Fornuto et al. | 137/588 |
| 4,790,349 | 12/1988 | Harris | 137/587 |
| 4,953,583 | 9/1990 | Szlaga | 137/118 |
| 4,971,104 | 11/1990 | Weber | 137/489.5 |
| 5,065,782 | 11/1991 | Szlaga | 137/39 |
| 5,116,257 | 5/1992 | Szlaga | 137/494 X |

Primary Examiner—Stephen M. Hepperle
Attorney, Agent, or Firm—Barnes & Thornburg

[57] ABSTRACT

An apparatus is provided for controlling venting of fuel vapor through an aperture in a fuel tank. The apparatus comprises a housing mounted in the aperture and a valve moveable in the housing between a blocking position blocking flow of fuel vapor from the fuel tank through the housing and a venting position allowing flow of fuel vapor from the fuel tank through the housing. A spring biases the valve towards its blocking position. A mechanism is provided for using fuel vapor from the fuel tank to move the valve against the spring towards its venting position. The using mechanism includes a venting control chamber receiving fuel vapor from the fuel tank in a conduit communicating fuel vapor from the fuel tank to the venting control chamber. The conduit includes a first portion and a second portion moveable relative to the first portion to define an intermediate portion. The apparatus further includes a flexible partition extending between the valve and the first portion to provide a barrier to prevent fuel vapor venting through the housing from entering the intermediate portion.

41 Claims, 3 Drawing Sheets

TANK VENTING CONTROL ASSEMBLY

BACKGROUND AND SUMMARY OF THE INVENTION

The present invention relates to tank venting control assemblies and particularly to apparatus for controlling the flow of fuel vapor through an aperture in a fuel tank. More particularly, the present invention relates to a tank venting control assembly for selectively discharging fuel vapor pressure in response to the development of high tank pressure conditions and for introducing air into the fuel tank in response to the development of vacuum conditions therein.

Fuel vapor can be created in the fuel tank by temperature differences between the fuel tank and liquid fuel from a fuel pump, as well as by sloshing and agitation of the fuel tank during normal vehicle operation. The pressure buildup resulting from the creation of new fuel vapors must be properly relieved. For this reason, many vehicle fuel systems are equipped with tank venting control assemblies capable of discharging a relatively large amount of fuel vapor in response to the development of high pressure conditions in the fuel tank.

It has long been desirable to maximize the sensitivity that can be achieved with tank venting control assemblies while at the same time minimizing manufacturing costs and assembly difficulties. It would be desirable to provide a tank venting control assembly sensitive enough to begin discharging fuel vapor from the fuel tank in response to pressure differentials as low as about 1-2 inches of water. In fact, a valve design meeting these requirements would closely simulate an open orifice. In any event, meeting the sensitivity requirement calls for a valve which can develop a relatively high actuation force in response to relatively low pressure differentials, long the focus of engineering efforts in this area.

Some tank venting control assemblies have relied upon the use of a small amount of fuel vapor from the fuel tank to provide a pressure signal to actuate the venting assembly, allowing discharge of large volumes of fuel vapor from the fuel tank. Such systems are disclosed, for example, in U.S. Pat. Nos. 4,953,583 and 5,065,782. However, it has proven difficult to design such systems to achieve the desired sensitivity without compromising manufacturability.

In addition to providing for adequate fuel vapor discharge from the fuel tank during high tank pressure conditions, well-designed tank pressure control assemblies must be capable of responding to the reduction of pressure in the fuel tank to below a predetermined level. These tank vacuum conditions are usually relieved by introducing ambient air to the fuel tank to bring the fuel vapor pressure in the fuel tank back to approximately atmospheric pressure. However, it has long been problematic to provide adequate tank vacuum relief functions without complicating the tank venting control assembly unnecessarily.

According to the present invention an apparatus is provided for controlling venting of fuel vapor through an aperture in a fuel tank. The apparatus comprises in part a housing mounted in the aperture and a valve moveable in the housing. The housing is formed to include an outlet and defines a vent path for fuel vapor between the fuel tank and the outlet. The valve is moveable in the housing between the locking position blocking flow of fuel vapor between the fuel tank and the outlet along the vent path in a venting position allowing flow of fuel vapor between the fuel tank and the outlet along the vent path. A spring biases the valve toward its blocking position.

The apparatus also comprises means for using fuel vapor from the fuel tank to move the valve against the spring towards its venting position. The using means includes a venting control chamber receiving fuel vapor from the fuel tank and a conduit communicating fuel vapor from the fuel tank to the venting control chamber. The conduit has a first portion and a second portion moveable relative to the first portion to define an intermediate portion.

The apparatus further comprises a flexible partition extending between the valve in the first portion of the conduit to provide a barrier to prevent fuel vapor venting through the vent path from entering the intermediate portion. The flexible partition is deformable to maintain the barrier when the valve moves away from its blocking position towards its venting position.

Advantageously, according to a preferred aspect of the invention, the conduit extends along a central axis of the housing. The assembly is highly symmetrical about the central axis, simplifying manufacturing and assembly.

Further according to the present invention, an apparatus is provided for controlling venting of fuel vapor through an aperture in a vehicle fuel tank and for introducing air into the fuel tank in response to the development of vacuum conditions therein. The apparatus comprises in part a housing mounted in the aperture and a valve moveable in the housing. The housing is formed to include an outlet, and defines a vent path for fuel vapor between the fuel tank and the outlet. The valve is moveable between the blocking position blocking flow of fuel vapor between the fuel tank and the outlet along the vent path and a venting position allowing flow of fuel vapor between the fuel tank and the outlet along the vent path.

The apparatus further comprises a valve actuator mounted in the housing. The valve actuator is moveable in response to fuel vapor pressure from the fuel tank between a static position allowing the valve to occupy its blocking position and an actuating position urging the valve towards its venting position.

The apparatus further comprises means for slidably coupling the valve actuator to the valve. The slidable coupling means allows the valve to move from its blocking position toward its venting position without moving the valve actuator from its static position to its actuating position in response to the reduction of fuel vapor pressure in the fuel tank below a predetermined level.

Additional objects, features, and advantages of the invention will become apparent to those skilled in the art upon consideration of the following detailed description of preferred embodiments exemplifying the best mode of carrying out the invention as presently perceived.

BRIEF DESCRIPTION OF THE DRAWINGS

The detailed description refers particularly to the accompanying figures in which.

DETAILED DESCRIPTION OF THE DRAWINGS

Figure 1:
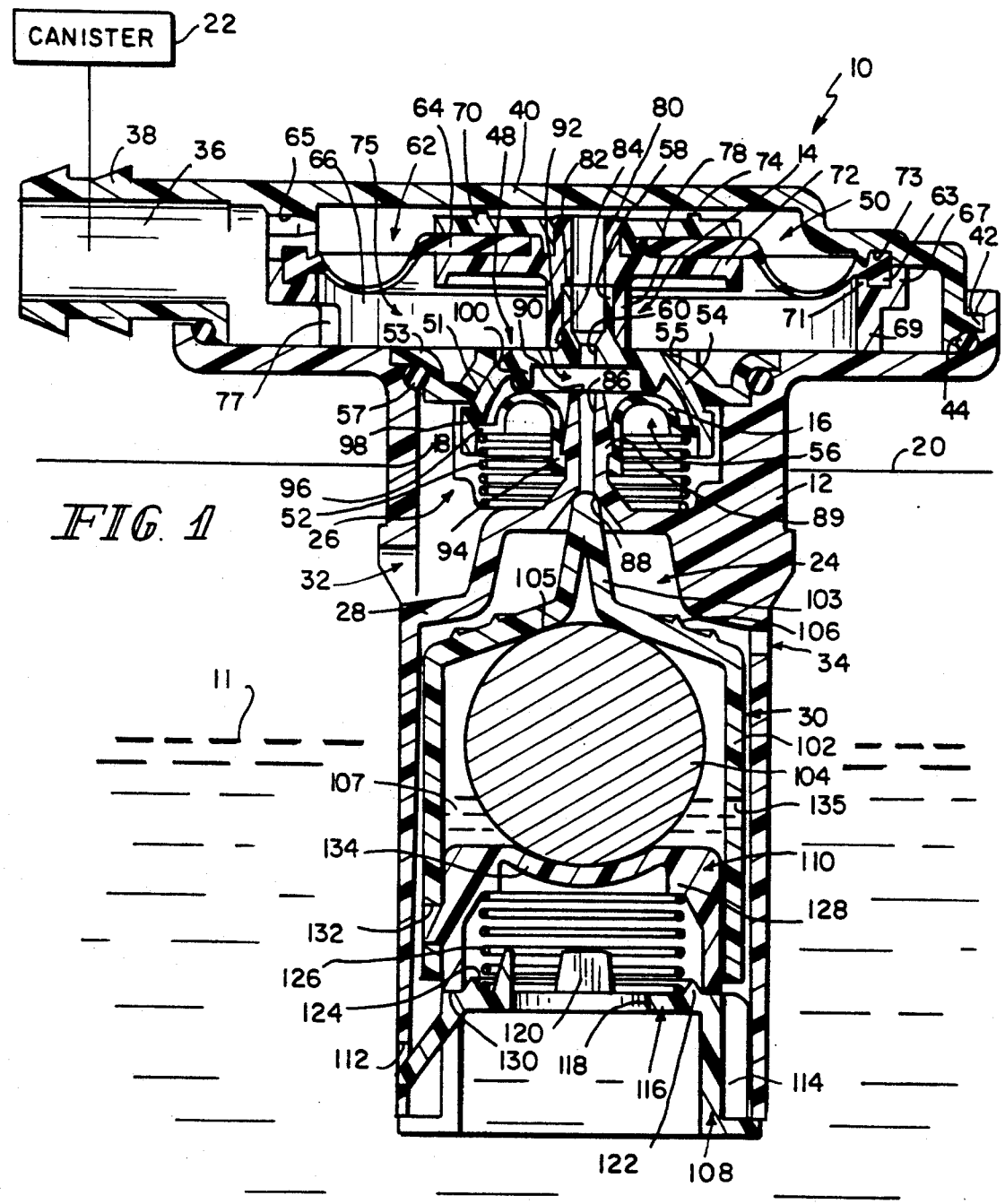
FIG. 1 is a sectional view of a tank venting control apparatus in accordance with the present invention showing the valve in its blocking position blocking flow of fuel vapor from the fuel tank to an outlet along a vent path.

One preferred embodiment of a tank venting control apparatus in accordance with the present invention is illustrated in FIG. 1. Apparatus 10 is shown to include a housing 12, a valve assembly 14, and a flexible partition 16 cooperating to provide venting of excess fuel vapor pressure from a fuel tank to an appropriate treatment device.

As shown in FIG. 1, apparatus 10 is designed to be mounted in an aperture 18 formed in a top wall 20 of a fuel tank. Apparatus 10 is typically connected to a fuel vapor treatment device 22, which may be, for example, a charcoal filled vapor recovery canister.

Housing 12 is formed to include a hollow interior which is divided into a lower chamber 24 and an upper chamber 26 by a flow shield 28. Lower chamber 24 houses a rollover valve assembly 30, while upper chamber 26 houses valve assembly 14 and partition 16.

Housing 12 is formed to include a plurality of inlet openings or windows 32 which allow fuel vapor from the fuel tank to pass into upper chamber 26. Inlet openings 32 are sized to permit relatively large volumes of fuel vapor to pass into upper chamber 26 for eventual venting through upper chamber 26 to canister 22 as will be subsequently described. Housing 12 is also formed to include a plurality of relatively small diameter inlet openings 34 which allow a relatively small volume of fuel vapor from the fuel tank to enter lower chamber 24. This relatively small volume of fuel vapor is transported to upper chamber 26 to serve as a pressure signal for actuating valve assembly 14 as will be subsequently described.

Housing 12 is also formed to include an outlet 36 which allows passage of fuel vapor from housing 12 to canister 22. In particular, an outlet tube 38 is formed in a cover 40 of housing 12. Cover 40 is designed for snap fitting engagement in a groove 42. An O-ring or other seal member 44 is provided to seal the joint where cover 40 snaps into groove 42.

Figure 2:
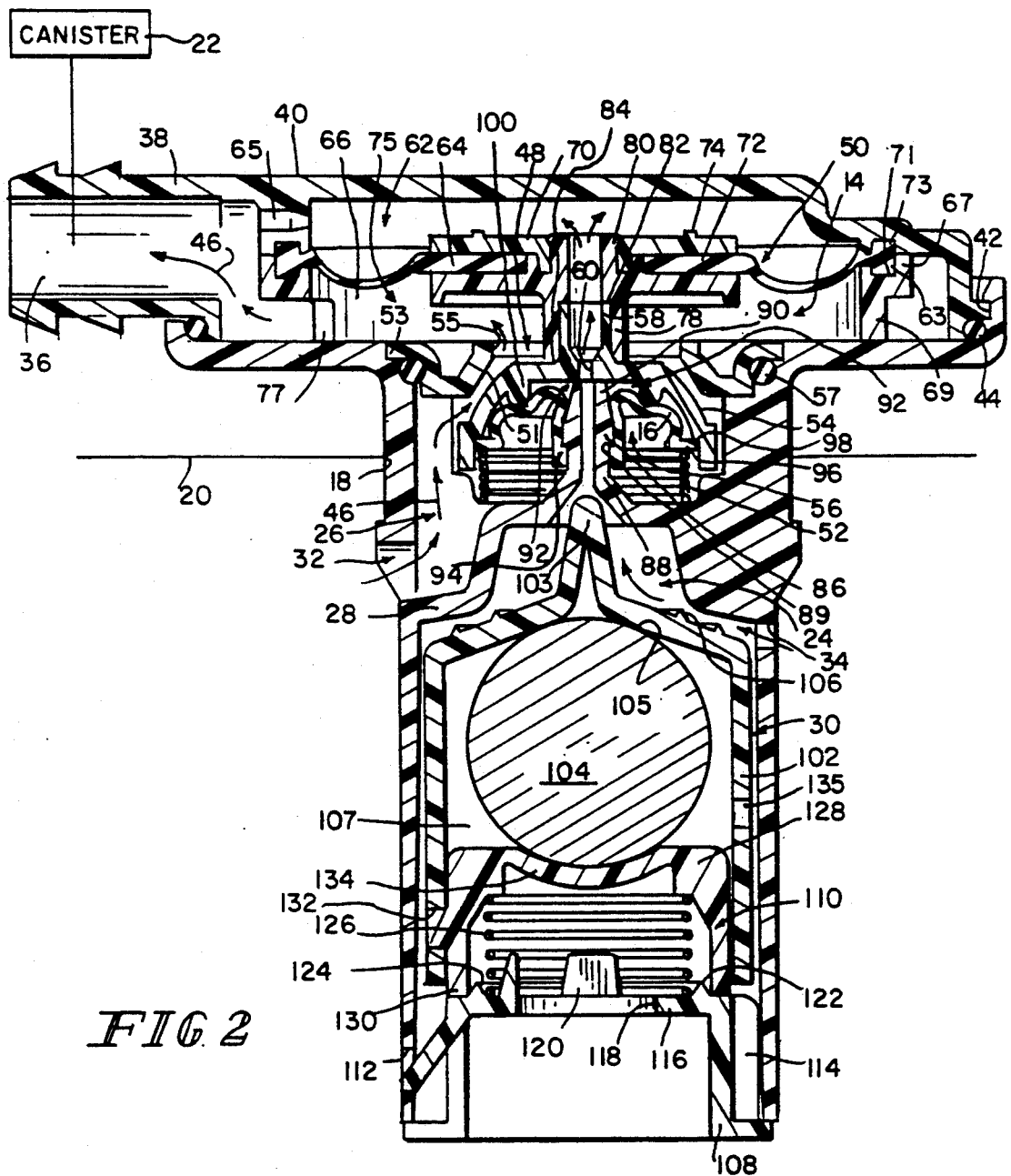
FIG. 2 is a view of the tank venting control apparatus of FIG. 1 showing the valve moved to its venting position allowing flow of fuel vapor from the fuel tank to the outlet along the vent path.

Housing 12 thus defines a vent path for fuel vapor between the fuel tank and outlet 36. As shown in FIG. 2, fuel vapor designated by arrows 46 flows from the fuel tank to outlet 36 along the vent path defined by housing 12.

The flow of fuel vapor along the vent path is controlled by valve assembly 14. Valve assembly 14 includes a valve 48 and a valve actuator 50. Valve 48 is typically of the variety of valves known as "poppet" valves.

Figure 3:
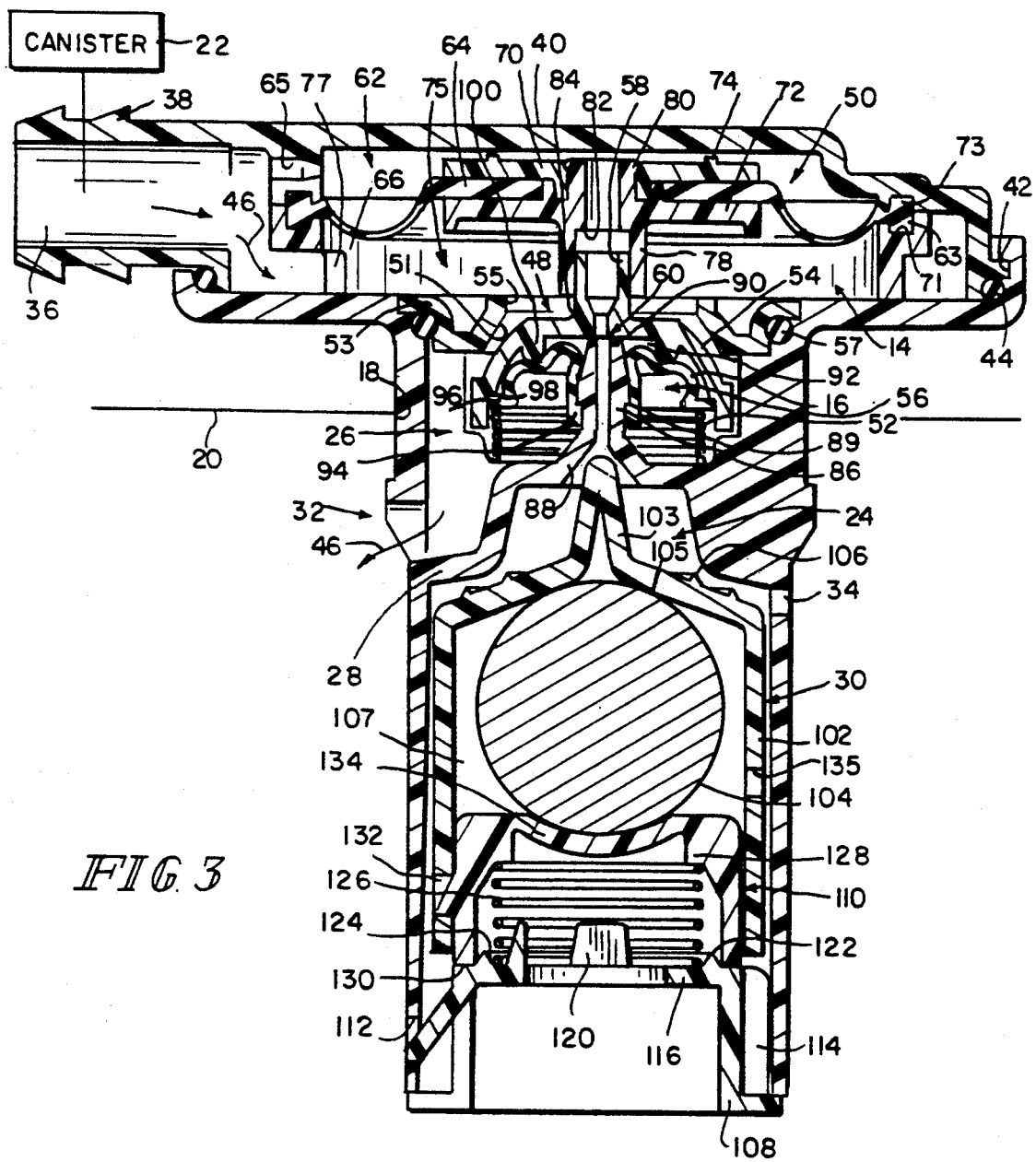
FIG. 3 is a view of the tank venting control apparatus of FIG. 1 showing a diaphragm assembly in its static position and a valve moved relative to the diaphragm assembly to a venting position when the fuel vapor pressure in the fuel tank is reduced to below a predetermined level.

Valve 48 is moveable between a blocking position (shown in FIG. 1) and a venting position (shown in FIGS. 2-3). When in its blocking position, valve 48 seats against a surface 51 of a partition 53 providing a valve seat. Partition 53 is preferably an annular insert formed to include an opening 55. A gasket 57 is provided to ensure a sealing engagement between partition 53 and the inner wall of housing 12. Valve 48, when thus seated, blocks flow of fuel vapor between the fuel tank and outlet 36 along the vent path. When moved away from surface 51 to its venting position, valve 48 allows flow of fuel vapor between the fuel tank and outlet 36 along the vent path. Valve assembly 14 also includes a spring 52 acting between flow shield 28 and valve 48 to bias valve 48 towards its blocking position.

Valve 48 includes an inverted cup 54 defining an interior region 56. Valve 48 also includes an upstanding sleeve 58 projecting from the central portion of inverted cup 54. Cup 54 is formed to include an opening 60 linking interior region 56 and the interior of sleeve 58 in fluid communication. Opening 60 serves as an inlet opening for sleeve 58.

Valve actuator 50 is provided to move valve 48 from its blocking position against spring 52 to its venting position when the fuel vapor pressure in the fuel tank exceeds a predetermined level. Fuel vapor from the fuel tank is used to depress valve actuator 50, which in turn urges valve 48 toward its venting position shown in FIG. 2.

Valve actuator 50 includes a diaphragm 64 or other suitable resilient sealing material having its peripheral edge mounted between an insert 66 and cover 40. Insert 66 is preferably a ring-shaped support member having an upper circular support portion 67 and a lower wall portion 69. Upper support portion 67 is formed to include a groove 71 sized to receive a peripheral edge 63 of diaphragm 64. Groove 71 aligns with a similar groove 73 formed in cover 40, cooperating therewith to provide a recess for receiving and supporting peripheral edge 63 of diaphragm 64.

Lower wall portion 69 cooperates with the underside of diaphragm 64 to define a chamber 75 beneath diaphragm 64. Lower wall portion 69 is preferably formed to include four equally spaced rectangular openings 77 serving as outlet apertures for chamber 75 for controlled release of fuel vapor from chamber 75. Fuel vapor venting past valve 48 through opening 55 enters chamber 75, where it is momentarily retained until it can pass through rectangular openings 77 to outlet 36.

Diaphragm 64 cooperates with cover 40 to define a venting control chamber 62 for receiving and using a fuel vapor signal from lower chamber 24 to apply pressure against diaphragm 64. Cover 40 is formed to include a bleed passageway 65 to connect venting control chamber 62 in fluid communication with outlet tube 38. Thus, fuel vapor accumulating in venting control chamber 62 eventually dissipates through bleed passageway 65 to outlet tube 38 and thence to outlet 36.

Diaphragm 64 is movable in response to an accumulation of fuel vapor pressure in venting control chamber 62 between a static position allowing valve 48 to remain in its blocking position seated against valve seat 51 (as shown in FIG. 1) and a actuating position urging valve 48 away from seat 51 against the bias of spring 52 toward its venting position (shown in FIG. 2). Advantageously, fuel vapor temporarily retained in chamber 69 assists in returning diaphragm 64 to its static position when venting from the fuel tank is no longer necessary. A pair of rigid plastic backing plates 70 and 72 sandwich diaphragm 64.

Backing plate 70 includes a pair of spaced apart straight ridges 74. Ridges 74 assist in temporarily capturing fuel vapor in the central portion of venting control chamber 62 to ensure that fuel vapor pressure acts across the central portion of diaphragm 64 instead of dissipating to outer portions of the venting control chamber 62 and escaping to outlet tube 38 by way of a bleed passageway 76 formed between venting control chamber 62 and outlet tube 38.

Backing plate 72 is formed to include a depending sleeve 78. An upper portion 80 of sleeve 78 projects through a central opening formed in diaphragm 64. Advantageously, sleeve 78 cooperates with sleeve 58 to provide means for slidably coupling valve actuator 50 to valve 48. Sleeve 78 includes an internal seat 82 mateable with the terminal portion of upstanding sleeve 58. The terminal portion of sleeve 78 engages a shoulder 84 on cup 54. Thus, valve actuator 50 engages sleeve 58 and cup 54 to move valve 48 away from its blocking position.

Further advantageously, sleeves 58 and 78 cooperate to provide a slip joint enabling valve 48 to move away from seat 51 toward its venting position without valve diaphragm 64 moving away from its static position toward its actuating position. This feature allows valve 48 to function as a vacuum relief valve. That is, when the fuel vapor pressure in the fuel tank is reduced to below a predetermined level, valve 48 can move away from its valve seat 51 without being actuated by valve actuator 50 to restore the fuel tank to approximately atmospheric pressure.

Another advantage of sleeves 58 and 78 is that they cooperate to provide a portion of a conduit for transmission of a small volume of fuel vapor to venting control chamber 62 to provide the actuation signal to diaphragm 62. As has been noted, the fuel vapor signal must be transported from lower chamber 24 to venting control chamber 62 to perform its function.

Apparatus 10 is thus provided with a conduit aligned along the central longitudinal axis of housing 12. This "concentric" construction provides numerous advantages. For example, the concentric arrangement allows for a relatively large diameter cup 54 with a small amount of travel between the blocking position and the venting position. This permits quicker response without enlarging the diameter of opening 55.

In addition, the present arrangement, by providing a relatively large volume chamber 75 for venting, allows for reduced fuel vapor velocity through opening 55. This is desirable because at higher fuel vapor velocities, entrained droplets of liquid fuel have a greater tendency to carry over through opening 55 to pass eventually to canister 22, reducing its effectiveness. The present arrangement further allows for the use of a relatively large diameter diaphragm 64 which is highly sensitive to even low levels of tank pressure while at the same time maintaining a relatively small diameter of housing 12. The conduit includes a first portion and a second portion moveable relative to the first portion to define an intermediate portion. A tube 86 provides the first portion of the conduit, while sleeves 58 and 78 cooperate to provide the second portion of the conduit.

Tube 86 projects upward from flow shield 28 along a central axis of housing 12. Tube 86 includes an inlet opening 88 placing tube 86 in fluid communication with fuel vapor in lower chamber 24. Tube 86 terminates in an outlet opening 90. Tube 86 is also provided with a retaining barb 89 to assist in retaining partition 16 in its proper position, preventing partition 16 from binding as cup 54 moves relative to tube 86 during venting.

As shown in FIG. 1, outlet opening 90 is aligned with inlet opening 60 of sleeve 58 and lies in axially spaced apart relationship therewith when valve 48 is in its blocking position, creating an intermediate portion 92 of the conduit. By contrast, when valve 48 is moved to its venting position as shown in FIGS. 2-3, the terminal portion of tube 48 may contact the inner wall of cup 54, thus bringing together outlet opening 90 and inlet opening 60.

When outlet opening 90 and inlet opening 60 lie spaced apart as shown in FIG. 1, fuel vapor escaping through outlet opening 90 into intermediate portion 92 might of course dissipate in upper chamber 26 rather than entering inlet opening 60 as is desired. In addition, fuel vapor entering upper chamber 26 through inlet openings 32 would be able to pass into intermediate portion 92.

This would have a particularly undesirable impact on the "closing point" of valve 48—i.e., the pressure at which valve 48 will return to its blocking position from its venting position to prevent further venting. If venting fuel vapor were allowed to enter interior region 56 and pass through opening 60 into sleeves 58, 78 to eventually reach venting control chamber 62, such fuel vapor might apply an unwanted actuating force to diaphragm 64. This would delay movement of diaphragm 64 back to its static position, and hence would delay movement of valve 48 back to its blocking position. Flexible partition 16 assists in preventing this problem by providing a barrier preventing fuel vapor venting through upper chamber 26 along the vent path indicated by arrows 46 from entering intermediate portion 92.

Flexible partition 16 is preferably a cylindrical rolling membrane composed of a low durometer liquid resistant elastomer. Partition 16 includes an outer peripheral edge 96 sealingly engaging a cylindrical seat 98 formed on the interior surface of cup 54. Peripheral edge 96 is held against seat 98 in part by the force of spring 52. Intermediate region 92, then, is defined by the inner wall of cup 54 and partition 94.

When partition 16 is exposed to excessive fuel vapor pressure from fuel vapor entering upper chamber 26 through inlet openings 32, partition 16 will flex and may, under extreme conditions, unseat from seat 98, causing undesirable intermixing of fuel vapor in vent path 46 and fuel vapor exiting outlet opening 90 of tube 86. To prevent partition 16 from unseating from seat 98, a cylindrical rib 100 is provided to project from the inner wall of cup 54 to abut partition 16.

Apparatus 10 is also provided with rollover valve assembly 30 as previously noted. Although any of a number of designs may be used, a preferred rollover valve assembly includes a float valve 102 or other liquid discriminator provided with a captured stainless steel ball 104 for inertial actuation of the float valve. Float valve 102 includes a nipple 103 to seat in sealing engagement with a surface 105 to block the flow of fuel vapor and liquid fuel from lower chamber 24 through inlet opening 88. The features and operations of a similar rollover valve assembly are described in U.S. Pat. No. 5,065,782, relevant portions of which are hereby incorporated by reference.

In particular, rollover valve assembly 30 includes, in addition to float valve 102 and captured ball 104, a retainer 108 and a support assembly 110. Float valve 102 cooperates with support assembly 110 to define a float chamber 107 in which ball 104 is positioned. Retainer 108 is designed to snap fit into openings 112 formed in housing 12. Retainer 108 also includes a plurality of vertically extending fins 114 positioned in approximately equally spaced intervals abut the circumference of retainer 108. Retainer 108 further includes a top surface 116 formed to include a circular opening 118 through which liquid fuel might pass at particularly high levels of liquid fuel in the fuel tank. Four vertically extending tabs 120, arranged in approximately equally spaced intervals, border opening 118. Alternatively, a continuous ring may be provided. A circular ridge 122 is also formed on top surface 116 in spaced apart relationship with tabs 120 to form an annular groove 124 therebetween to serve as a seat for a spring 126. Tabs 120 assist in maintaining spring 126 in its proper position in groove 124.

Spring 126 extends between top surface 116 of retainer 108 (seating in groove 124 as described above) and four interior tabs 128 formed in support assembly 110. Spring 126 assists in moving support assembly 110 away from retainer 108 to cam against ball 104, thereby moving rollover valve 102 from its open position allowing flow of fuel vapor from the fuel tank through inlet opening 88 and its closed position preventing flow of fuel vapor from the fuel tank through inlet opening 88.

Support assembly 110 terminates in a circular face 130 which normally rests upon top surface 116. Support assembly 110 snap fits into openings 132 formed in float valve 102 so that support assembly 110 moves with float valve 102. Support assembly 110 further includes a curved upper surface 134 providing a seat for ball 104 to insure proper camming relationship between ball 104 and support assembly 110. The curvature of curved upper surface 134 may be varied according to design considerations. For example, the curvature might be varied so that float valve 102 remains in its open position as the vehicle is subjected to a grade of less than or equal some predetermined amount. Optionally, a plurality of openings (not shown) may be formed on support assembly 110 in approximately equally spaced intervals about curved upper surface 134, allowing passage of a limited amount of fuel vapor therethrough.

Rollover valve assembly 30 is also provided with a plurality of rings 106 formed on the upper surface of float valve 102 to prevent liquid fuel migration across the surface as fuel vapor passes through inlet opening 34 into lower chamber 24 and thence to inlet opening 88. Thus, rings 106 assist in preventing liquid fuel carryover into tube 86.

In addition, float valve 102 may be provided with a plurality of longitudinally extending ribs (not shown) evenly spaced about its outer surface. Such ribs assist in minimizing the area of frictional contact between float valve 102 and the inner wall of housing 12. Thus, float valve 102 will properly float on liquid fuel entering the lower portion of lower chamber 24 and will move to close off inlet opening 88 when the fuel tank is tilted beyond a predetermined angle as during vehicle rollover.

Another feature of apparatus 10 relating to the performance of rollover valve assembly 30 is a plurality of vent holes (not shown) formed in housing 12 in fluid communication with lower chamber 24. The vent holes prevent a "stand pipe" effect that might otherwise occur when the liquid fuel level rises above the lower portion of lower chamber 24. Float valve 102 may also be formed to include an opening 135 to determine the buoyant height thereof while retaining enough weight so that float valve 102 will reopen.

Operation of the illustrated embodiment of the invention with valve 48 in its blocking position is shown in FIG. 1. Valve 48 occupies its blocking position as shown when fuel vapor pressure in the fuel tank is relatively low. Float valve 102 may occupy the position as shown blocking flow of liquid fuel and fuel vapor through inlet opening 88 if the liquid fuel level in the fuel tank is relatively high. Otherwise, float valve 102 will be moved to a position away from inlet opening 88 allowing passage of fuel vapor therethrough.

At relatively low tank pressures with float valve 102 moved away from inlet opening 88, a small volume fuel vapor can pass through the conduit formed by tube 86 and sleeves 58, 78 to reach venting control chamber 62 to serve as a pressure signal for diaphragm 64. Specifically, fuel vapor in lower chamber 24 can pass through inlet opening 88 to tube 86, exiting at outlet opening 90. When valve 48 is in its blocking position, tube 86 is axially spaced apart from sleeve 58. That is, the first portion of the conduit is spaced apart from the second portion of the conduit to define intermediate portion 92. Fuel vapor exiting tube 86 at outlet opening 90 passes into intermediate portion 92.

However, with flexible partition 16 in place, fuel vapor in intermediate portion 92 is prevented from dissipating and intermixing with fuel vapor entering upper chamber 26 through inlet opening 32. Instead, fuel vapor is retained in intermediate portion 92 for passage through opening 60 to the passageway defined by sleeve 58. Likewise, fuel vapor entering upper chamber 26 to vent along vent path 46 is prevented from entering intermediate portion 92.

The fuel vapor then passes through sleeve 58 directly to sleeve 78, which is positioned in slidable but tight sealing relationship with sleeve 58. Finally, the fuel vapor exits sleeve 78 to venting control chamber 62, accumulating first in the central portion thereof due to the presence of ridges 74.

However, at low tank pressures, the fuel vapor accumulating in venting control chamber 64 does not supply sufficient force to diaphragm 64 to move diaphragm 64 away from its static position as shown in FIG. 1. Valve 48 thus remains in its blocking position preventing flow of fuel vapor through upper chamber 26 along vent path 46.

As shown in FIG. 2, at higher tank pressures, the fuel vapor pressure signal in venting control chamber 62 applies sufficient force to diaphragm 64 to move diaphragm 64 to its actuating position, in turn moving valve 48 from its blocking position to its venting position. Specifically, when sufficient pressure builds up in venting control chamber 62 to depress diaphragm 64, sleeve 78 acts against both sleeve 58 and directly against cup 54 at shoulder 84 thereof to urge valve 48 away from seat 51 against the bias of spring 52.

Since peripheral edge 96 of partition 16 is seated against seat 98 of cup 54, edge 96 is urged to move along with cup 54. However, tubular portion 94 of partition 16 is seated against tube 86, which is fixed against movement. Advantageously, partition 16 is designed to flex or roll to maintain the barrier separating fuel vapor in intermediate portion 92 from fuel vapor entering upper chamber 26 through inlet opening 32. The flexure shown in FIG. 2 is exaggerated somewhat for illustrative purposes beyond what is contemplated in normal operation of apparatus 10.

As relatively high volumes of highly pressurized fuel vapor enter upper chamber 26 through inlet opening 32, it is possible that substantial force will be exerted on flexible partition 16 on the lower surface thereof—that is, in the direction opposite the direction of movement of valve 48. Advantageously, cylindrical rib 100 is provided to abut partition 16 as shown to prevent this force from unseating partition 16 from its seat 98.

Once valve 48 has been urged away from seat 51, fuel vapor can flow along vent path 46 through housing 12 to outlet 36, and thence to vapor recovery canister 22 as shown. Valve 48 will remain in this venting position until the fuel vapor pressure in the fuel tank is reduced to acceptable levels.

As the fuel vapor pressure in the fuel tank is reduced through venting, the pressure in venting control chamber 62 is of course also reduced. The force applied by fuel vapor in venting control chamber 62 diminishes to the point at which it becomes insufficient to maintain diaphragm 64 in the actuating position. Diaphragm 64 thus begins to return to its static position shown in FIG. 1. Fuel vapor remaining in venting control chamber 62 is forced out through bleed passageway 65 to outlet tube 38, eventually exiting through outlet 36.

In addition, as valve 48 moves back toward seat 51, partition 16 flexes to return to its position as shown in FIG. 1. Thus, partition 16 continues to maintain the barrier between fuel vapor in intermediate portion 92 and fuel vapor entering upper chamber 26 though inlet opening 32.

Operation of apparatus 10 during tank vacuum conditions is illustrated in FIG. 3. When the fuel vapor pressure in the fuel tank is reduced to below a predetermined level, it is desirable to provide vacuum relief by reverse flow of air at atmospheric pressure along vent path 46 from outlet 36 to inlets 32 and thence to the fuel tank. To effect such reverse flow along vent path 46, valve 48 must of course be moved away from its blocking position toward its venting position. Under high tank pressure conditions, this would be accomplished by pressure buildup in venting control chamber 62 to move diaphragm 64 to actuate valve 48.

Under tank vacuum conditions, however, the pressure in venting control chamber 64 will obviously be insufficient to move diaphragm 64 from its static to its actuating position. However, the pressure differential across valve 48 will be sufficient to move valve 48 away from its blocking position. The pressure in outlet tube 38, and hence on the outer portion of cup 54, will be approximately atmospheric, while the pressure beneath cup 54 (the pressure in the fuel tank) will be lower than atmospheric.

Advantageously, valve 48 is capable of decoupling from valve actuator 50 to react to this pressure differential. As valve 48 is urged away from seat 51 toward its venting position, sleeve 58 slides relative to sleeve 78 as shown in FIG. 3. Thus, valve 48 is moved to its venting position while diaphragm 64 remains in its static position.

Ambient air can then flow in reverse along vent path 46 to reach the fuel tank, relieving the tank vacuum conditions. As the pressure in the fuel tank returns to approximately atmospheric, spring 52 biases valve 48 back to its blocking position seated against seat 51.

Rollover valve 30 is designed both for the purpose of preventing liquid fuel from passing from the fuel tank through lower chamber 24 to venting control chamber 62 and for the purpose of providing a back pressure sufficient to trigger the automatic shut off mechanism provided in a fuel filler nozzle so as to prevent the introduction of excess fuel into the fuel tank during refueling. Rollover valve assembly 30 is also designed to quickly move to a closed position preventing flow of fuel vapor and liquid fuel through inlet opening 88 when exposed to sloshing or vertical surges of liquid fuel. The term "sloshing" as used herein refers to the tendency of liquid fuel to form waves moving essentially horizontally in response to vehicle vibration or rocking.

During normal vehicle operation with relatively low levels of liquid fuel in the fuel tank, float valve 102 is moved to an open position allowing flow of fuel vapor from the fuel tank through lower chamber 24 the venting control chamber 62, as shown, e.g., in FIGS. 2 and 3. However, when apparatus 10 is exposed to sloshing or to vertical surges of liquid fuel 11, it is anticipated that a relatively large volume of liquid fuel could become entrained in fuel vapor and could be carried over through inlet opening 88 unless float valve 102 quickly moves to a closed position in sealing engagement with surface 105 as shown, e.g., in FIG. 1. To minimize such liquid fuel carryover, support assembly 110 is placed directly in the flow path of the surging or sloshing fuel. That is, liquid fuel passes through opening 118 to impinge on the underside of curved upper surface 134 of support assembly 110. The momentary upward force provided by the surging or sloshing fuel, in addition to the upward biasing force supplied by spring 126, acts to move support assembly 110 to cam against ball 104. Ball 104 in turn cams against surface 105 of float valve 102 to move float valve 102 to its closed position preventing flow of fuel vapor and liquid fuel through inlet opening 88.

Similarly, rollover valve assembly 30 is designed to close when the vehicle is tilted beyond a predetermined angle, as when the vehicle rolls over during an accident or is subject to an extreme grade, to prevent liquid fuel from escaping from the fuel tank to the venting control chamber 62 and potentially to canister 22. When the vehicle is tilted beyond a predetermined angle, ball 104 rolls relative to curved upper surface 134. This lateral displacement of ball 104 is thus translated to vertical lifting of float valve 102 by the camming engagement of ball 104 against surface 105 of float valve 102. During rollover, as the vehicle nears complete inversion, spring 126 will assist in forcing support assembly 110 upwardly to assist in moving float valve 102 to its closed position.

Rollover assembly 30 is preferably designed so as to also respond to inertial effects due to vehicle motion. Specifically, during extreme acceleration or deceleration of the vehicle, ball 104 will move laterally on curved upper surface 134, moving float valve 102 toward its closed position.

Rollover assembly 30 is also designed to close during exposure to a high level of liquid fuel as during refueling. During refueling, it is desirable that float valve 102 close at a predetermined level of liquid fuel to prevent the escape of fuel vapor through inlet opening 88 to venting control chamber 62 to thereby prevent the fuel vapor from acting against diaphragm 64. When fuel vapor is thus retained in the fuel tank during refueling, a vapor blanket forms at the top of the fuel tank, providing a back pressure sufficient to trigger the fuel nozzle shut off mechanism to shut off the flow of liquid fuel into the fuel tank before the fuel tank is completely filled with liquid fuel. This is desirable because it leaves space within the fuel tank for expansion of liquid fuel should the fuel tank be subjected to high temperatures.

When liquid fuel reaches relatively high levels in the fuel tank, liquid fuel passes through opening 118 of retainer 108 and may pass through holes (not shown) in support assembly 110 to reach float chamber 107. The buoyant force created by liquid fuel in float chamber 107 becomes sufficient to lift float valve 102 to its closed position independent of ball 104 and support assembly 110.

Although the invention has been described in detail with reference to certain preferred embodiments, variations and modifications exist within the scope and spirit of the invention as described and defined in the following claims.

We claim:

1. An apparatus for controlling venting of fuel vapor through an aperture in a fuel tank, the apparatus comprising
    a housing mounted in the aperture and formed to include an outlet, the housing defining a vent path for fuel vapor between the fuel tank and the outlet,
    a valve movable in the housing between a blocking position blocking flow of fuel vapor between the fuel tank and the outlet along the vent path and a venting position allowing flow of fuel vapor between the fuel tank and the outlet along the vent path,
    a spring biasing the valve toward its blocking position,
    means for using fuel vapor from the fuel tank to move the valve against the spring toward its venting position, the using means including a venting control chamber receiving fuel vapor from the fuel tank and a conduit communicating fuel vapor from the fuel tank to the venting control chamber, the conduit having a first portion and a second portion movable relative to the first portion to define an intermediate portion, and
    a flexible partition extending between the valve and the first portion to provide a barrier to prevent fuel vapor venting through the vent path from entering the intermediate portion, the flexible partition being deformable to maintain the barrier when the valve moves away from its blocking position toward its venting position.

2. The apparatus of claim 1, wherein the valve includes an inverted cup defining an interior region, the first portion of the conduit extends into the interior region to define an annular space between the first portion and the cup, and the flexible partition extends across the annular space.

3. The apparatus of claim 2, wherein the inverted cup includes an interior cylindrical ring defining a seat and the flexible partition includes a peripheral edge seating against the seat.

4. The apparatus of claim 1, wherein the flexible partition is formed to include a central opening and a depending tubular portion communicating with the central opening, the tubular portion being sized to fit in sealing relationship over the first portion of the conduit so that fuel vapor exiting from the first conduit passes through the central opening.

5. The apparatus of claim 1, wherein the valve includes an inverted cup defining an interior region and a cylindrical rib extending into the interior region to support at least a portion of the flexible partition to prevent the flexible partition from disengaging from the valve by the force of fuel vapor in the vent path.

6. The apparatus of claim 1, wherein the valve includes an inverted cup defining an interior region, the spring extends into the interior region, and flexible partition is nested between the spring and the inverted cup in the interior region.

7. An apparatus for controlling venting of fuel vapor through an aperture in a fuel tank, the apparatus comprising
    a housing mounted in the aperture and formed to include an outlet, the housing defining a vent path for fuel vapor between the fuel tank and the outlet,
    a valve assembly mounted in the housing and including a valve and a valve actuator, the valve being movable between a blocking position blocking flow of fuel vapor between the fuel tank and the outlet along the vent path and a venting position allowing flow of fuel vapor between the fuel tank and the outlet along the vent path, the valve actuator including a venting control chamber receiving fuel vapor from the fuel tank to apply pressure to the valve actuator so that the valve actuator urges the valve toward its venting position,
    a conduit communicating fuel vapor from the fuel tank to the venting control chamber, the conduit including a first portion and a second portion movable relative to the first portion to define an intermediate portion, and
    a flexible partition extending between the valve and the first portion to provide a barrier to prevent fuel vapor venting through the vent path from entering the intermediate portion.

8. The apparatus of claim 7, wherein the valve includes an inverted cup defining an interior region, the first portion of the conduit extends into the interior region to define an annular space between the first portion and the cup, and the flexible partition extends across the annular space.

9. The apparatus of claim 8, wherein the inverted cup includes an interior cylindrical ring defining a seat and the flexible partition includes a peripheral edge seating against the seat.

10. The apparatus of claim 7, wherein the flexible partition is formed to include a central opening and a depending tubular portion communicating with the central opening and sized to fit in sealing relationship over the first portion of the conduit so that fuel vapor exiting the first portion passes through the central opening.

11. The apparatus of claim 7, wherein the valve defines an interior region and includes a cylindrical rib extending into the interior region to support at least a portion of the flexible partition to prevent the flexible partition from disengaging from the valve by the force of fuel vapor in the vent path.

12. The apparatus of claim 7, wherein the valve includes an inverted cup defining an interior region, the spring extends into the interior region, and flexible partition is nested between the spring and the inverted cup in the interior region.

13. An apparatus for controlling venting of fuel vapor through an aperture in a vehicle fuel tank, the apparatus comprising
    a housing mounted in the aperture and formed to include an outlet, the housing defining a vent path for fuel vapor between the fuel tank and the outlet, a valve movable in the housing between a blocking position blocking flow of fuel vapor between the fuel tank and the outlet along the vent path and a venting position allowing flow of fuel vapor between the fuel tank and the outlet along the vent path, the valve being formed to include a first flow channel having an inlet opening into the fuel tank, a valve actuator formed to include a second flow channel having an inlet opening sized to mate with the first flow channel, the valve actuator being mounted in the housing and movable relative to the valve in response to fuel vapor pressure from the fuel tank between a static position allowing the valve to occupy its blocking position and an actuating position urging the valve towards its venting position, and means for slidably coupling the valve actuator to the valve to maintain the first and second flow channels in fluid communication so that the valve moves from its blocking position toward its venting position without moving the valve actuator from its static position to its actuating position and without breaking fluid communication between the first and second flow channels when the fuel vapor pressure in the fuel tank is reduced to below a predetermined level.

14. An apparatus for controlling venting of fuel vapor through an aperture in a vehicle fuel tank, the apparatus comprising a housing mounted in the aperture and formed to include an outlet, the housing defining a vent path for fuel vapor between the fuel tank and the outlet, a valve movable in the housing between a blocking position blocking flow of fuel vapor between the fuel tank and the outlet along the vent path and a venting position allowing flow of fuel vapor between the fuel tank and the outlet along the vent path, a valve actuator mounted in the housing and movable in response to fuel vapor pressure from the fuel tank between a static position allowing the valve to occupy its blocking position and an actuating position urging the valve towards its venting position, and means for slidably coupling the valve actuator to the valve so that the valve moves from its blocking position toward its venting position without moving the valve actuator from its static position to its actuating position when the fuel vapor pressure in the fuel tank is reduced to below a predetermined level, the coupling means including a first sleeve formed on the valve actuator and a second sleeve formed on the valve and slidable within the first sleeve to allow the valve to move relative to the valve actuator when the pressure in the fuel tank is reduced to below a predetermined level.

15. The apparatus of claim 14, wherein the first sleeve cooperates with the second sleeve to define a signal path communicating fuel vapor from the fuel tank to the valve actuator.

16. The apparatus of claim 14, wherein the first sleeve includes a seat and the second sleeve terminates in a face sealingly engaging the seat when the fuel vapor pressure in the fuel tank is at least a normal level.

17. An apparatus for controlling venting of fuel vapor through an aperture in a vehicle fuel tank, the apparatus comprising a housing mounted in the aperture and formed to include an outlet, the housing defining a vent path for fuel vapor between the fuel tank and the outlet, a valve movable in the housing between a blocking position blocking flow of fuel vapor between the fuel tank and the outlet along the vent path and a venting position allowing flow of fuel vapor between the fuel tank and the outlet along the vent path, a valve actuator mounted in the housing and movable in response to fuel vapor pressure from the fuel tank between a static position allowing the valve to occupy its blocking position and an actuating position urging the valve towards its venting position, and means for slidably coupling the valve actuator to the valve so that the valve moves from its blocking position toward its venting position without moving the valve actuator from its static position to its actuating position when the fuel vapor pressure in the fuel tank is reduced to below a predetermined level, the valve actuator including a diaphragm and the coupling means including a first sleeve extending through the diaphragm and a second sleeve formed on the valve.

18. An aperture for controlling venting of fuel vapor through an aperture in a fuel tank, the apparatus comprising a housing mounted in the aperture and formed to include an outlet, the housing defining a vent path for fuel vapor between the fuel tank and the outlet, a valve movable in the housing between a blocking position blocking flow of fuel vapor between the fuel tank and the outlet along the vent path and a venting position allowing flow of fuel vapor between the fuel tank and the outlet along the vent path, the valve being formed to include a first flow channel, a spring biasing the valve toward its blocking position, means for using fuel vapor passing from the fuel tank through the first flow channel to move the valve against the spring toward its venting position, the using means including a valve actuator for urging the valve toward its venting position and a venting control chamber receiving fuel vapor passing from the fuel tank through the first flow channel provided in the valve to apply pressure to the valve actuator, and means for slidably coupling the valve actuator to the valve to permit relative movement therebetween so that the valve moves from its blocking position toward its venting position and away from the valve actuator when the fuel vapor pressure in the fuel tank is reduced to below a predetermined level.

19. An apparatus for controlling venting of fuel vapor through an aperture in a fuel tank, the apparatus comprising a housing mounted in the aperture and formed to include an outlet, the housing defining a vent path for fuel vapor between the fuel tank and the outlet, a valve movable in the housing between a blocking position blocking flow of fuel vapor between the fuel tank and the outlet along the vent path and a venting position allowing flow of fuel vapor between the fuel tank and the outlet along the vent path, a spring biasing the valve toward its blocking position, means for using fuel vapor from the fuel tank to move the valve against the spring toward its venting position, the using means including a valve actuator for urging the valve toward its venting position and a venting control chamber receiving fuel vapor from the fuel tank to apply pressure to the valve actuator, and means for slidably coupling the valve actuator to the valve so that the valve moves from its blocking position toward its venting position away from the valve actuator when the fuel vapor pressure in the fuel tank is reduced to below a predetermined level, the coupling means including a first sleeve formed on the valve actuator and a second sleeve formed on the valve and slidable within the first sleeve to allow the valve to move relative to the valve actuator when the pressure in the fuel tank is reduced to below a predetermined level.

20. The apparatus of claim 19, wherein the first sleeve cooperates with the second sleeve to define a signal path communicating fuel vapor from the fuel tank to the valve actuator.

21. The apparatus of claim 19, wherein the first sleeve includes a seat and the second sleeve terminates in a face sealingly engaging the seat when the fuel vapor pressure in the fuel tank is at least a normal level.

22. An apparatus for controlling venting of fuel vapor through an aperture in a fuel tank, the apparatus comprising a housing mounted in the aperture and formed to include an outlet, the housing defining a vent path for fuel vapor between the fuel tank and the outlet, a valve movable in the housing between a blocking position blocking flow of fuel vapor between the fuel tank and the outlet along the vent path and a venting position allowing flow of fuel vapor between the fuel tank and the outlet along the vent path, a spring biasing the valve toward its blocking position, means for using fuel vapor from the fuel tank to move the valve against the spring toward its venting position, the using means including a valve actuator for urging the valve toward its venting position and a venting control chamber receiving fuel vapor from the fuel tank to apply pressure to the valve actuator, and means for slidably coupling the valve actuator to the valve so that the valve moves from its blocking position toward its venting position away from the valve actuator when the fuel vapor pressure in the fuel tank is reduced to below a predetermined level, the valve actuator including a diaphragm and the coupling means including a first sleeve extending through the diaphragm and a second sleeve formed on the valve.

23. An aperture for controlling venting of fuel vapor through an aperture in a fuel tank, the apparatus comprising a housing mounted in the aperture and formed to include an outlet, the housing defining a vent path for fuel vapor between the fuel tank and the outlet, a valve movable in the housing between a blocking position blocking flow of fuel vapor between the fuel tank and the outlet along the vent path and a venting position allowing flow of fuel vapor between the fuel tank and the outlet along the vent path, a spring biasing the valve toward its blocking position, means for using fuel vapor from the fuel tank to move the valve against the spring toward its venting position, the using means including a valve actuator using fuel vapor from the fuel tank to urge the valve toward its venting position, a venting control chamber receiving fuel vapor from the fuel tank to apply pressure to the valve actuator, and a conduit communicating fuel vapor from the fuel tank to the venting control chamber, the conduit including a first portion and a second portion movable relative to the first portion to define an intermediate portion, the second portion including an upstanding sleeve movable with the valve and a depending sleeve movable with the valve actuator and slidably engaging the upstanding sleeve so that the valve can move away from the valve actuator toward its venting position in response to reduction of pressure in the fuel tank below a predetermined level, and a flexible partition extending between the valve and the first portion to provide a barrier to prevent fuel vapor venting through the vent path from entering the intermediate portion, the flexible partition being deformable to maintain the barrier when the valve moves away from its blocking position toward its venting position.

24. The apparatus of claim 23, wherein the valve includes an inverted cup defining an interior region, the first portion of the conduit extends into the interior region to define an annular space between the first portion and the cup, and the flexible partition extends across the annular space.

25. The apparatus of claim 24, wherein the inverted cup includes an interior cylindrical ring defining a seat and the flexible partition includes a peripheral edge seating against the seat.

26. The apparatus of claim 23, wherein the flexible partition is formed to include a central opening and a depending tubular portion communicating with the central opening, the tubular portion being sized to fit in sealing relationship over the first portion of the conduit so that fuel vapor exiting from the first conduit passes through the central opening.

27. The apparatus of claim 23, wherein the valve includes an inverted cup defining an interior region and a cylindrical rib extending into the interior region to support at least a portion of the flexible partition to prevent the flexible partition from disengaging from the valve by the force of fuel vapor in the vent path.

28. The apparatus of claim 23, wherein the valve includes an inverted cup defining an interior region, the spring extends into the interior region, and flexible partition is nested between the spring and the inverted cup in the interior region.

29. The apparatus of claim 23, wherein the first sleeve includes a seat and the second sleeve terminates in a face sealingly engaging the seat when the fuel vapor pressure in the fuel tank is at least a normal level.

30. The apparatus of claim 23, wherein the valve actuator includes a diaphragm and the coupling means includes a first sleeve extending through the diaphragm and a second sleeve formed on the valve.

31. The apparatus of claim 13, wherein the valve includes a valve member, a seal-establishing surface on the valve member, the coupling means includes a first stem coupled to the valve member, and the first stem is formed to include the first flow channel.

32. The apparatus of claim 31, wherein the valve actuator includes a diaphragm covering a fuel vapor-receiving chamber formed in the housing, the coupling means further includes a second stem coupled to the diaphragm, and the second stem is formed to include the second flow channel.

33. The apparatus of claim 32, wherein the first and second stems engage one another in telescoping relation to maintain the first and second flow channels in fluid communication during relative movement of the first and second stems.

34. The apparatus of claim 31, wherein the valve member includes an inverted cup defining an interior region communicating with the vehicle fuel tank and the first stem is coupled to the inverted cup to place the inlet opening of the first flow channel in fluid communication with the interior region of the inverted cup.

35. The apparatus of claim 34, wherein the housing is formed to include an upper chamber and a lower chamber, the upper chamber contains the valve, the valve actuator, and the coupling means, the housing further includes a fixed partition separating the upper and lower chambers and providing a conduit communicating fuel vapor from the fuel tank to the interior region of the inverted cup, a rollover valve movable in the lower chamber to open and close the conduit, and a flexible partition extending between the inverted cup and the fixed partition to provide a barrier to prevent fuel vapor venting through the vent path from entering the interior region of the inverted cup, the flexible partition being deformable to maintain the barrier when the valve moves in the housing toward its venting position.

36. The apparatus of claim 18, wherein the valve actuator is formed to include a second flow channel receiving fuel vapor passing from the first flow channel to the venting control chamber.

37. The apparatus of claim 36, wherein the valve actuator includes a diaphragm covering the venting control chamber and a stem coupled to the diaphragm and the stem is formed to include the second flow channel.

38. The apparatus of claim 37, wherein the coupling means includes a sleeve appended to the valve and slidably engaging the stem of the valve actuator and the sleeve is formed to include the first flow channel.

39. The apparatus of claim 18, wherein the using means further includes a conduit fixed to the housing, the conduit is formed to include an inlet receiving fuel vapor from the vehicle fuel tank and an outlet discharging fuel vapor to the first flow channel of the valve, and a flexible partition extending between the valve and the conduit to provide a barrier to prevent fuel vapor venting through the vent path from entering the first flow channel, the flexible partition being deformable to maintain the barrier when the valve moves in the housing toward its venting position.

40. The apparatus of claim 39, wherein the valve includes an inverted cup defining an interior region, the conduit is formed to include an outlet opening communicating with the interior region during movement of the valve relative to the conduit, and the flexible partition is positioned to lie in the interior region of the inverted cup.

41. The apparatus of claim 40, wherein the valve further includes an interior cylindrical ring defined a set and the flexible partition includes a peripheral edge seating against the seat.

* * * * *